(12) United States Patent
Rosen

(10) Patent No.: US 8,369,994 B1
(45) Date of Patent: Feb. 5, 2013

(54) APPARATUS AND METHOD FOR ANALYSIS, MEASUREMENT AND REMOTE DISPLAY OF ENERGY SAVINGS ACHIEVED BY SIMULTANEOUS COMPARATIVE ENABLING OF FEATURES OF AN HVAC ENERGY MANAGEMENT SYSTEM FOR USE IN A HOTEL OR MOTEL

(76) Inventor: Howard Rosen, Montreal (CA)

( * ) Notice: Subject to any disclaimer, the term of this patent is extended or adjusted under 35 U.S.C. 154(b) by 213 days.

(21) Appl. No.: 12/610,191

(22) Filed: Oct. 30, 2009

(51) Int. Cl.
*G05B 15/00* (2006.01)
(52) U.S. Cl. ........................... 700/277; 700/300
(58) Field of Classification Search .................. 700/276, 700/277, 299, 300
See application file for complete search history.

(56) References Cited

U.S. PATENT DOCUMENTS

2009/0248704 A1* 10/2009 Greenwell et al. ............ 707/100
2009/0302996 A1* 12/2009 Rhee et al. .................... 340/3.32

* cited by examiner

*Primary Examiner* — Carlos Ortiz Rodriguez
(74) *Attorney, Agent, or Firm* — Marc E. Hankin; Kevin Schraven; Hankin Patent Law, APC

(57) ABSTRACT

A method and/or apparatus providing for evaluation and illustration of the effects of installing and using specific features of an Energy Management System is disclosed. The system is typical of those utilized in Heating Ventilation and Air Conditioning (HVAC) control systems. In one illustrated embodiment, cost savings that are achievable following installation of an HVAC system with certain selectable features are clearly illustrated and controllable in an easily understood and useful way, including from remote locations such as over the internet.

12 Claims, 3 Drawing Sheets

MOTEL 99
EMS MANAGEMENT
ROOM LAYOUT VIEW ( AND "PAIRING" OF
ROOMS FOR
MEASUREMENTS AND
REPORTING )

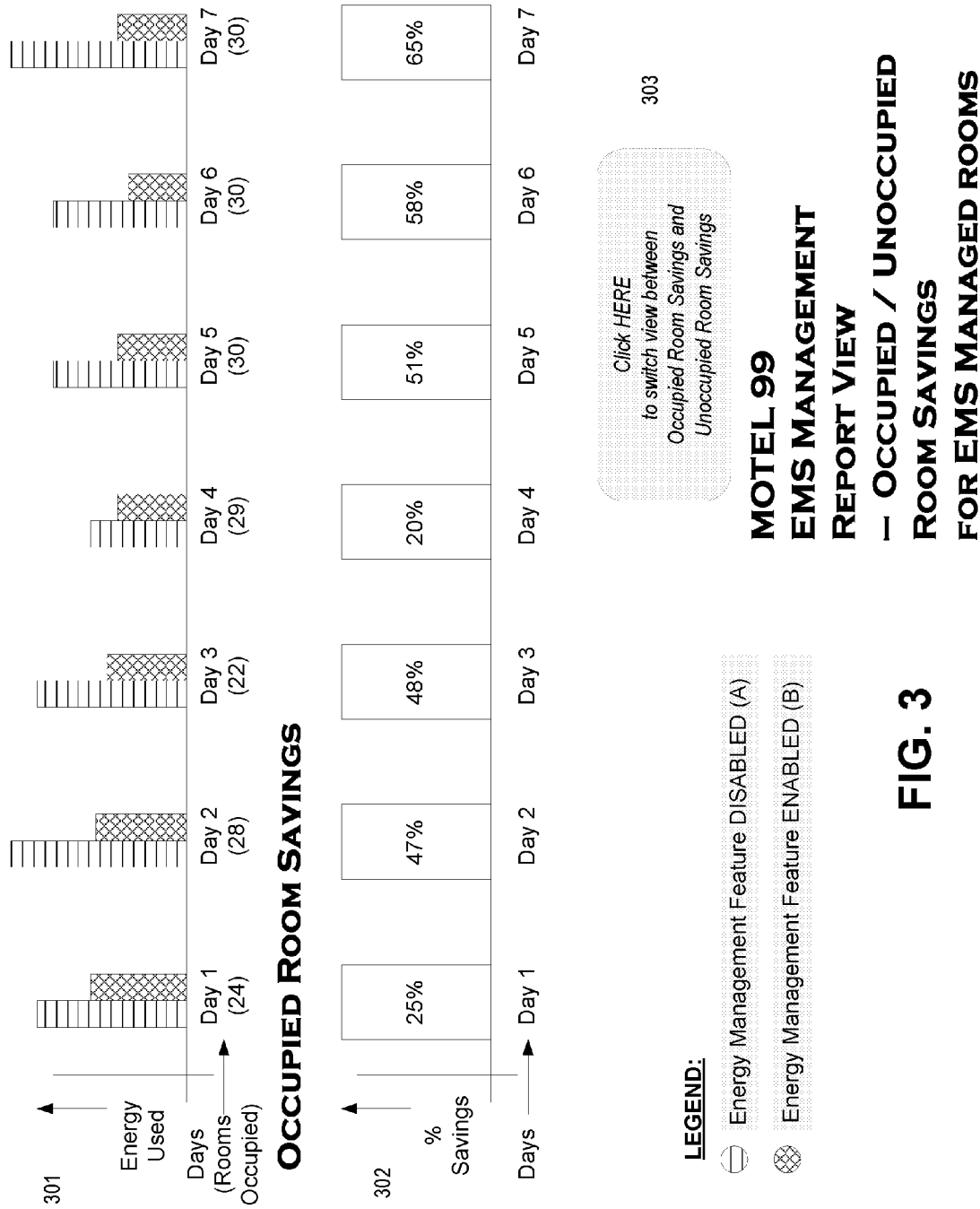

APPARATUS AND METHOD FOR ANALYSIS, MEASUREMENT AND REMOTE DISPLAY OF ENERGY SAVINGS ACHIEVED BY SIMULTANEOUS COMPARATIVE ENABLING OF FEATURES OF AN HVAC ENERGY MANAGEMENT SYSTEM FOR USE IN A HOTEL OR MOTEL

BACKGROUND OF THE INVENTION

The present invention relates to Heating Ventilation and Air Conditioning (HVAC) systems, improving operation of these systems, and providing for improvements in the methods, and/or algorithms used in the management of energy used by these HVAC systems.

In the HVAC industry there is potential for sales of HVAC equipment with specialized or optimized control networks that incorporate various algorithms and/or mechanisms intended to improve energy efficiency during operation of the HVAC. In the lodging industry there is great potential for energy savings because guests in a hotel or motel are typically not the ones that are directly footing the bill for heating or cooling. HVAC vendors may propose various HVAC control systems or energy management systems for offer to the lodging industry, and these systems may be offered with the intention of improving comfort and/or reducing costs of operations of the HVAC system, or in general to reduce utility costs. However, directly relating a claim of savings in operation of a system to an actual achievable savings is difficult, in particular because energy usage for HVAC may vary widely depending on weather conditions, levels of occupancy, and many other factors. Therefore it is difficult to measure or even estimate energy savings achievable by a particular system, algorithm or mechanism. This makes it difficult to optimize algorithms or mechanisms incorporated within the system in order to maximize savings or other improvements, and it also makes it difficult to market or sell such systems to the lodging industry. Even though the system may indeed offer improvements, it is difficult to convincingly demonstrate the savings. It is even more difficult to demonstrate or measure the savings of specific features of energy management control in an installed system. It is also difficult to illustrate savings in a simple manner easily understood by people that are not experts or who do not have the time to study reports and/or details in an energy management report.

BRIEF SUMMARY OF THE INVENTION

Therefore it would be useful to provide a means and/or methodology for evaluating and/or demonstrating the effects of applying various Energy Management system algorithms or features utilized in operation of an Energy Management System, or HVAC control system. It would be further beneficial to present measured results in a manner that is easily understandable, and to further provide a way to easily customize the selection of features so as to provide feedback to a user in such a manner so as to convincingly demonstrate results from application and comparison of the effectiveness of user selected Energy Management System features.

It is also useful to provide illustration and measurement of savings on an installed and operational system in the field (e.g. in an operating hotel or motel, or in some of the rooms in a hotel or motel).

In an illustrated embodiment of the present invention, an HVAC energy management system includes a control and/or monitoring mechanism or device by which rooms or spaces within a hotel can be monitored and an indication of energy used by the HVAC system in conditioning air provided to those specific rooms, spaces, or groups of rooms or spaces can be estimated or measured. The Energy Management system further includes a capability for selectively turning on or off Energy Management System features in selected rooms, spaces or areas, with different features applied at the same time to different rooms, spaces or areas. That is, at the same time, a group of spaces can be controlled one way, while another group of spaces is controlled another way.

The system or user of the system may also be optionally provided by the Energy Management System (e.g. via or on a display screen or browser window) with information relating to the physical layout of the rooms or spaces in a manner such that those rooms which are either adjacent, or those which have similar energy related physical characteristics can be compared. The Energy Management System includes capability for collecting and presenting data relating to energy usage in specific selected rooms, spaces or areas, or groups of rooms, spaces or areas. The Energy Management System provides from a remote location for comparing the estimated energy used in rooms with selected energy management features enabled to the estimated energy used in another set of "similar" rooms with those same selected energy management features turned off, that is, disabled.

The invention provides for this comparison to be done with the measurement and collection of data done for both cases simultaneously. That is, for example, the measurement (evaluation) is made with the selected Energy Management feature turned on in some rooms and off in other rooms, with the selection of the groups of rooms assigned such that the physical characteristics of the rooms managed with the features turned on, closely match the physical characteristics of the rooms managed with the features turned off. This greatly reduces or even nearly eliminates all the effects of weather, exposure, time of day, etc. by evaluating both situations (energy management feature(s) turned on or off) simultaneously.

It is noted that these examples and discussion describing energy management features as being "enabled" or "disabled", or "on" or "off" are exemplary only, and in a further enhancement to the illustrated embodiment described above, the Energy Management System provides for the selection and comparison of groups of energy management features to alternative groups of energy management features. The alternatives are not limited to simply "on" or "off" but may be a combination of several or more features turned on or off, or with features managed in two more complex ways. Alternative algorithms, even complex algorithms, can be compared by applying the alternatives over a period of time to a group of physically similar spaces and recording the results for evaluation.

For example, in two adjacent or similarly situated rooms, one or more energy management features provided by the Energy Management System can be selectively turned on for one room, and off for the other. An indication of energy used by one room in comparison to that used by the other room is then obtained, and in this manner the effectiveness of any specific proposed energy management system or feature of the system, or combinations of features, can be evaluated. The results of the evaluation further is able to be presented in a manner that is clear and convincing because the presentation of an energy use estimate for each space or room is an easily understood concept. An even more convincing story can be presented by allowing a customer or user to make selection of rooms through the Energy Management System for comparison with certain features enabled or disabled, and to then observe the effect over a period of time.

The amount of energy used or expended by the Energy Management System for a specific room over a period of time can be determined in many ways known or determined by one skilled in the art of HVAC design or control. In a hotel or motel room in which a Packaged Terminal Air Conditioning (PTAC) unit is installed for each room, the energy usage could be quite accurately estimated by simply recording the amount of time that the compressor of the PTAC was turned on, and optionally also by measuring the amount of time the air circulating fan was turned on. In a system where a central system provides cool air or water, air flow, water flow, or other measurements indicative of energy usage could be used.

The most convenient method for estimating energy usage, as applicable to PTAC units which are commonly used in hotels and motels for cooling individual rooms is to simply monitor compressor on/off time, and also optionally fan on/off time. The compressors and fans of identical or similar units in adjacent or nearby rooms typically draws about the same amount of energy when turned on, and therefore the period of time that the compressor is turned on is indicative of the amount of energy used. (The fan also uses some energy and can be monitored at the same time, or in a similar manner).

It is further an advantage in applying the teachings of the present invention to provide for control and observation of Energy Management System operation from a central location which collects data from a number of comparative rooms or spaces and presents such data for observation. It is a further advantage when this data can be sent to a central location or website across the internet (World Wide Web) or by phone line, or mobile phone or other widespread means of data communication so that, for example, both the management of a hotel or motel and/or the manufacturer or designer of the Energy Management System can observe, tweak, or control the system with the goal of either demonstrating efficient energy management, or to improve the operation of the system over time.

Utilizing the internet as a data transmission and/or collection means to present results from the Energy Management System, for example, allows for the effectiveness of specific or collected Energy Management System features to be very effectively demonstrated to the owners of a hotel or motel, to the designers of the system, to salesman trying to sell the system, or any other people interested in the results. This approach provides the potential for continued improvement in the energy efficiency of the energy systems being used in hotels and motels across the country, or even around the world, by providing for clear, convenient, and convincing illustration of energy usage results as the system runs, or at the completion of a testing period. In several illustrated embodiments the invention provides for effective and clear presentation of the results of applying proposed Energy Management System features, and if the comparison can be arranged to be done on a "live" facility (one in active use) the benefits, properly presented, can be made clear, or even obvious. This may significantly enhance the likelihood of making a sale to a facility.

In another illustrated embodiment of the present invention, comparative Energy System Management efficiency is estimated for specific rooms or groups of rooms using the Energy Management System and presented by the system to the owners or operators of a hotel or motel for use in determining room reservations, with one possible improvement being able to select for use the most energy efficient rooms to have priority for use over the less efficient rooms.

In another illustrated embodiment of the invention, control of the Energy System Management by selection of features to be applied in chosen spaces is accomplished by utilizing a web browser or other interactive display connected over the internet thus providing for remote selection of Energy Management System features to be applied to selected groups of rooms over a user controllable period of time, and then further providing for collection and display of results during or following such a period of time. With a carefully chosen display of comparative data between the energy costs incurred during the defined period of time, an easily understood presentation of this data can be implemented by one skilled in the art of computer programming and web applications. For presentation to a "lay" audience, or those not familiar with details or without enough time to study details, a simple graph illustration comparing energy usage for a set of adjacent or physically similar rooms or spaces of a facility, with half of the spaces being controlled one way, and the other half the other way provides a simple but high impact and easily understood demonstration of energy usage comparison results. This demonstration or illustration can be made even more effective when the internet is used to connect to the controlled facility so that any data collected is able to be observed in real time.

The information displayed can include, for example, occupancy statistics, weather statistics, instantaneous occupancy data, energy cost estimates, and other similar data which have effect in some way on energy usage or which have an effect on the algorithms used in energy management of the facility.

In a further illustrated embodiment, a plurality alternative techniques or algorithms are evaluated in the same manner by assigning several "groups" of rooms or spaces and applying the alternative management techniques.

In an exemplary illustrated embodiment applying one or more features of the invention, the following describes a scenario which utilizes several features of the invention. This description is meant to be completely exemplary, and not meant to be limiting in description of the invention.

First, a sales person representing a manufacturer of Energy Management Systems for control of an HVAC system proposes, to the owners of a hotel for example, installation of an Energy Management System that incorporates thermostats which have improved energy control features over those of the prior art. Presentation is made by the sales person to the owners and permission is given to install the thermostats for demonstration purposes.

Next, a group of 30 rooms, for example, is chosen for evaluation. Technicians go to the facility and thermostats that include monitoring and control capability as needed are installed in all 30 rooms. (In this example we will assume each room is served by a single PTAC).

While at the site, the physical layout of the rooms is captured, and then back at the manufacturer's office this information is depicted on a chart and incorporated into a web browser display that (with Javascript for example) allows choosing of pairs of rooms to be assigned to two groups.

The sales person then goes to the owners and pulls up a "choose some rooms" web browser page developed specifically for the owner's facility and asks them to group the 30 rooms into 15 pairs of rooms, with an attempt to select rooms for pairing that are physically similar. (It is an advantage to have the people making the decisions (typically the owners) to participate in the experiment). The owners are also asked to choose a period of time for the experiment, for example one week (and of course maybe a starting date and time) with this choice, for example, also provided on the same or another browser page. For this example the owners are assumed to have chosen a one week period for the experiment starting immediately.

The experiment is launched and the owners can observe the system starting to work. The sales person goes home and the returns a week later to meet again with the owners. The meeting is held in a conference room at the owner's office with a display on a big screen that provides a web browser connection to the internet. The sales person logs onto a computer system serving as a data collection apparatus for the facility. The experiment is terminated and a results reporting page is pulled up onto the screen based upon energy management information gathered at the facility for all of the 30 chosen rooms for the past week. The data is presented both graphically and/or in text form, with graphically probably being the most impressive and more quickly and easily understood. (Graphical meaning a combination of text, pictures, charts, bar graphs and the like, that is, not just text, but pictorial in nature). The comparison shows that for 14 out of the 15 rooms there was significant savings demonstrated for rooms managed by the proposed Energy Management System, and even in the 15th pair of rooms the results were no worse. Therefore, in a wonderful case example, the potential savings in three months exceeds the sale price for the system and the owner decides on the spot to order the Energy Management system for all properties that the owners manage.

It is noted that certain elements of the present invention could be implemented as hardware, software, or as firmware components or a combination of such as a matter of design choice, and that description of any specific implementation does not imply that a specific or limiting approach is implied. The description is exemplary in describing one or more illustrated embodiments, and alternatives could be readily determined or designed by one skilled in the art.

BRIEF DESCRIPTION OF THE SEVERAL VIEWS OF THE DRAWING

The invention will be better understood by means of the following description, given only as an example and in reference to the attached drawings. Other advantages, purposes and characteristics of the present invention will emerge from the following detailed description and with reference to the attached drawings, in which.

DETAILED DESCRIPTION OF THE SEVERAL VIEWS OF THE DRAWING

Figure 1:
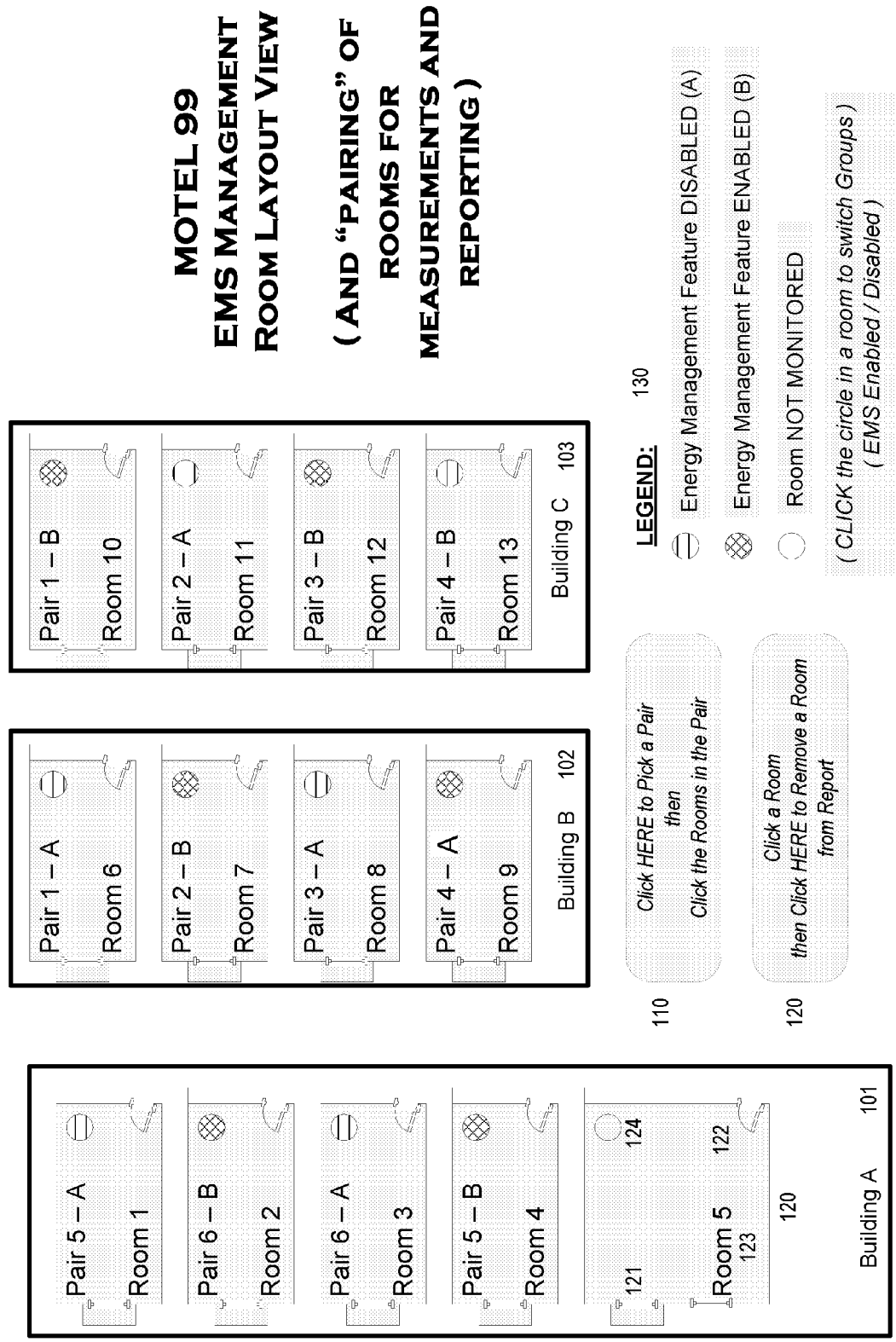
FIG. 1 illustrates an exemplary web browser style display screen depicting a user interface screen for display on a display means that provides a user with a physical view of the layout of rooms of a motel facility, the screen providing for the user to assign rooms in pairs into groups of rooms with one group having Energy Management features applied, and the other group having Energy Management features disabled, or perhaps configured differently (possibly in another screen not illustrated)

FIG. 1 depicts exemplary features of an illustrated embodiment of the invention illustrating graphical and textual content of a display screen displayed by the display means that provides a graphical interface for a user to select rooms or spaces in a facility for a paired comparison in application of one or more Energy Management Features of an HVAC system, the system including PTAC units shown on the back of each room in the FIG. 1. In this example, the idea is to show on the screen a rough physical layout of the rooms in a motel facility (Motel 99). This screen would typically be a screen customized based upon the actual layout of the motel rooms. The depiction could be either very accurate, or a rough drawing would suffice. The display screen used for this purpose could also be done with all text, but the graphical depiction provides an easier and probably faster way to visualize the choices.

In FIG. 1, fifteen motel rooms are depicted in 3 separate buildings (Buildings A 101, B 102, and C 103). The buildings are shown with relative spacing as in the actual facility. Since weather conditions and sun exposure and even nearness to a paved parking lot in the facility may all have effect on heating/cooling loads, more detail, without going to an extreme, is better but not required. Any pairing of rooms "could" be used, but the measurement results would tend to be less accurate. Also, choosing pairs of rooms that are actually side by side, and providing for the owners or managers of the building to actually make the selection is an important feature of the invention when it is to be used in marketing or "selling" the energy management features of integrated in an HVAC control system. It is a significant advantage in practice of some embodiments of the invention relating to marketing when an owner can, for example, choose or select rooms that are side by side for comparison, and then specify the amount of time for the test. With this approach an owner may feel quite involved in the test and may buy into the results more readily, because he or she was a part of the experiment. Having the owner participate helps them to actually think about the experiment and what it is demonstrating more readily than a more common sales presentation.

Note that it is possible to assign rooms into groups without the concept of "pairing" rooms, that is, by simply picking an equal or approximately equal number of rooms into groups A and B, and then proceeding to make the measurements and generate a report. The pairing concept does provide for more accuracy, more believable results for presentation in marketing or selling a product, and provides an easier way to make divide a set of rooms into two groups. It is advantageous in making measurements to have the characteristics of the rooms in the two groups approximately the same, and picking similar rooms in pairs provides an advantageous approach that is advantageous in certain embodiments which practice concepts of the present invention.

In FIG. 1, the rooms are depicted within each building with a PTAC unit for cooling, a door, and a circular "button" that depicts information relating to the assignment of the room into groups. In the Figure, Room 5 120 in Building A is depicted with reference numbers to denote the PTAC unit 121, the door to the room 122, the Room number designation 123, and the "button" 124 which provides indication as to into which group the room is assigned, that is, whether the energy management features will be enabled or disabled. The legend 130 at the lower right of the figure provides guidance as to the meaning of the "buttons". Two larger buttons 110 120 in the lower middle of the exemplary display screen are intended for the user to begin selection of a pair of rooms 110, or to remove rooms from the pairing 120. These buttons are "clicked" to start a command and then a click on the user's selected room or pair of rooms completes the command. This screen is exemplary with not all features described completely, but it is illustrative of an interface that would provide for ease of use in carrying out at least one embodiment of the present invention. Many other approaches for making selections and presenting the information for display could be devised by those skilled in the art of computer programming and/or web design, or other similar skill in programming.

Figure 2:
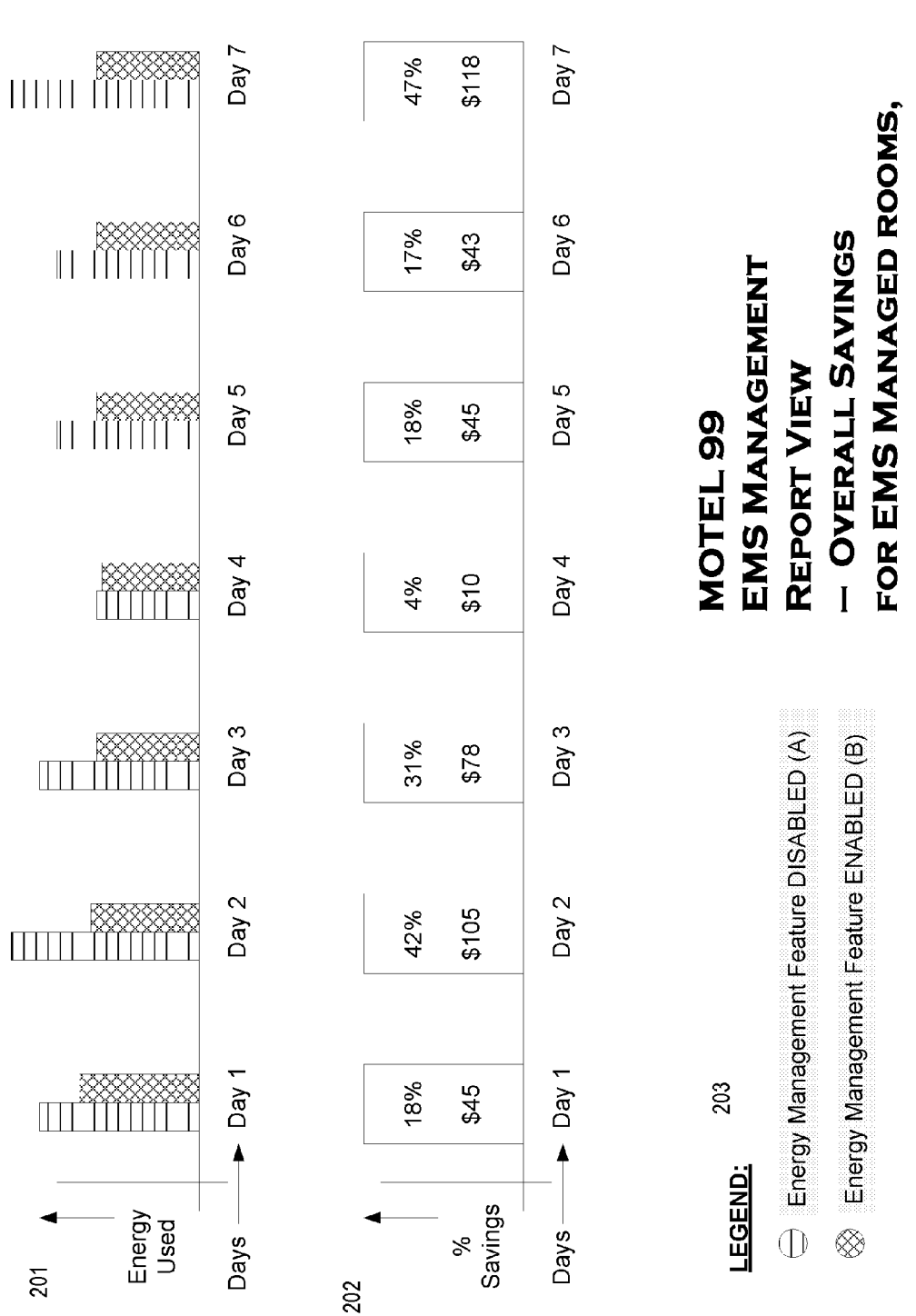
FIG. 2 illustrates an exemplary report providing a graphical illustration of overall savings achieved in application of Energy Management feature(s) for a seven day period of time, including a summary of energy used in a group of rooms with and without the feature applied, and also including a percentage of savings estimate; and, FIG. 3 illustrates in another exemplary report similar to that of FIG. 2 wherein the presentation is made for two groups of rooms but including only those rooms that have been occupied during each daily period, or unoccupied during each daily period.

FIG. 2 illustrates an exemplary report providing information relating to at least one illustrated embodiment of the present invention. FIG. 2 provides two graphs 201 202 that illustrate in a comparative manner possible energy savings due to managing energy usage in one group of rooms or spaces versus another group. A legend 203 at the lower left of the figure provides guidance as to meanings within the graphs. In FIG. 2, the first graph 201 provides in an easy to understand manner a graphical illustration of overall savings achieved in application of Energy Management feature(s) over a seven day period of time. The first graph depicts energy used in a bar chart over a period of time of seven days. Each day has two numbers represented, a first number being related to the energy used in conditioning air for all rooms in group A, group A being those rooms with a selected Energy Management Feature disabled (or at least configured differently than group B). Group B includes rooms with those features enabled (or at least different than group A). The two numbers for each day in bar chart form provide easily visualized comparison of the savings for each day, and because of the approach chosen to building the groups of rooms, that is, selecting rooms that are similar as pairs for dividing into two groups, the comparison is readily believable.

The second graph 202 in FIG. 2, which could be presented on the same screen or a different screen than the first graph, depicts the comparative savings each day in both percentage terms, and in real dollars. In order to determine a dollar amount for the savings for each day, the estimated energy utilized in conditioning the air for each group of rooms must be measured each day, and saved for reporting purposes. The cost of energy must also be provided. If energy costs vary throughout the day or week (time of day rates) the estimated money for each day is more complex and requires measuring and recording energy requirements for each of the different periods of varying energy costs. These and many variations on these calculation would be readily apparent to one skilled in the art of HVAC and/or computer programming.

The display of the savings each day as a percentage is particularly applicable to sales and marketing of a system, because the owner of the facility may know very well the total energy costs for heating and cooling a large facility and can make a simple multiplication to estimate savings for a month or a year or any other period of time.

FIG. 3 presents two graphs 301 302 with almost the same information as in FIG. 2 except in FIG. 3 provision is made with a button 303 on the display screen to select a display of costs and savings for those rooms which were occupied during each day, or unoccupied.

FIG. 2 illustrated overall cost comparisons for all rooms under management of a feature, whereas FIG. 3 illustrates cost comparisons for pairs of rooms that were either both occupied, or both unoccupied during a period of time within the measurement period. (If one room is occupied and the other not, then a choice to throw out the data related to those rooms on those days might be made).

Energy used in heating and cooling, or lighting, or other uses may very well be quite dependent on occupancy or levels of occupancy. For example, in a motel equipped with a PTAC, the PTAC may be turned completely off when the room is not occupied, so there is no opportunity for an energy management system to accomplish any savings. Thermostats often have occupancy sensors built into the thermostat units, or information relating to occupancy could be obtained in other ways such as based upon computer records of reservations.

FIG. 3 therefore illustrates in an exemplary report similar to that of FIG. 2 wherein the presentation is made for two groups of rooms but including only those rooms that have both been occupied during each daily period. An alternative report can be generated for those rooms which are, or both unoccupied during each daily period with that option chosen by selection of a "button" shown in FIG. 3 and marked with the text "Click HERE to switch view between Occupied Room Savings and Unoccupied Room Savings".

The presentation of this information for all of these FIGS. 1, 2 and 3 is exemplary and many other approaches to making choices and assignments consistent with the teachings of the present invention and for displaying comparative results in either a textual or graphical form could be devised by those skilled in the art of HVAC system design and/or computer programming or web programming.

Thus, while the principles of the invention have now been made clear and described relative to a number of illustrative embodiments or implementations, it will be immediately obvious to those skilled in the art the many modifications or adaptations which can be made without departing from those principles. While the invention has been shown and described with reference to specific illustrated embodiments, it should be understood by those skilled in the art that various changes in form and detail may be made such implementations without departing from the spirit and scope of the invention as defined by the following claims.

Having described the preferred embodiments of the invention, it will now become apparent to one of skill in the arts that other embodiments or implementations incorporating the teachings of the present invention may be used. Accordingly, these embodiments should not be limited to the disclosed embodiments or implementations but rather should be limited only by the spirit and scope of the following claims.

What is claimed is:

1. An apparatus for evaluating efficiency of an Energy Management System that includes one or more Energy Management features, the Energy Management System installed in a facility and operatively coupled to a network for controlling over the network one or more HVAC (Heating, Ventilation, and Air Conditioning) units used for conditioning of air supplied to a plurality of conditioned spaces within the facility, the apparatus comprising:

A) a display screen generated by a display mechanism, the display screen displaying physical space layout information relating to physical layout of the conditioned spaces within the facility;

B) a selection mechanism, associated with the display screen, enabling a selection and assignment of the conditioned spaces into at least a first and a second group of spaces, the selection and assignment aided by the displaying of the physical space layout information;

C) a control mechanism, in response to the selection and assignment made through the selection mechanism, controlling application of at least one of the Energy Management features differently between 1) conditioning of air supplied to spaces in the first group of spaces, and 2) conditioning of air supplied to spaces in the second group of spaces;

D) a measurement mechanism providing first group comparative energy usage data indicative of an amount of energy or cost of energy used by the one or more HVAC units for providing conditioned air to one or more conditioned spaces in the first group of spaces, and second group comparative energy usage data indicative of an amount of energy or cost of energy used by one or more HVAC units for providing conditioned air to one or more conditioned spaces in the second group of spaces;

E) a data collection mechanism operatively coupled to the measurement mechanism and collecting the first group and the second group comparative energy usage data during a measurement time period, wherein the first group comparative energy usage data and the second group comparative energy usage data are collected over the same measurement time period; and, F) a reporting mechanism operatively coupled to the data collection mechanism and generating a comparative energy usage report, the comparative energy usage report based upon both the first group and the second group comparative energy usage data collected with the application of at least one of the Energy Management features being applied differently for spaces in the first group of spaces than for spaces in the second group of spaces.

2. The apparatus of claim 1 wherein the display mechanism is connected to at least one other element included in the Energy Management System over an internet network and the selection mechanism associated with the display mechanism being further used in making selections relating to the application of the Energy Management features for use in conditioning the first group of spaces and the second group of spaces.

3. The apparatus of claim 1 wherein the display mechanism provides a graphical display presenting at least some information of the comparative energy usage report.

4. The apparatus of claim 1 wherein the selection and assignment of conditioned spaces to at least a first and a second group of spaces is performed utilizing a graphical interface presented on the display screen.

5. The apparatus of claim 1 wherein the comparative energy usage report includes information relating to energy used related to spaces within the first and second group of spaces that were occupied, and information relating to energy used related to spaces within the first and second groups of spaces that were unoccupied for a period of time within the measurement time period.

6. An apparatus for evaluating efficiency of an Energy Management System that includes one or more Energy Management features, the Energy Management System installed in a facility and operatively coupled to a network for controlling over the network one or more HVAC (Heating, Ventilation, and Air Conditioning) units used for conditioning of air supplied to a plurality of conditioned spaces within the facility, the apparatus comprising:

A) a display apparatus generating a display screen displaying physical characteristic information relating to physical characteristics potentially affecting energy usage for the plurality of the conditioned spaces within the facility;

B) a selection apparatus enabling the user to perform a selection and assignment of conditioned spaces into at least a first group and a second group of spaces, the selection aided by the displaying of the physical characteristic information of the conditioned spaces within the facility;

C) a control apparatus, in response to the selection and assignment, controlling application of at least one of the Energy Management features differently between 1) controlling conditioning of air supplied to spaces in the first group of spaces, and 2) controlling conditioning of air supplied to spaces in the second group of spaces;

D) a measurement apparatus providing first group comparative energy usage data indicative of an amount of energy or cost of energy used by one or more HVAC units for providing conditioned air to one or more conditioned spaces in the first group of spaces, and second group comparative energy usage data indicative of an amount of energy or cost of energy used by one or more HVAC units for providing conditioned air to one or more conditioned spaces in the second group of spaces;

E) a data collection apparatus operatively coupled to the measurement apparatus for collecting the first group and the second group comparative energy usage data concurrently during a measurement time period; and, F) a reporting apparatus operatively coupled to the data collection apparatus for generating a comparative energy usage report, the comparative energy usage report based upon both the first group and the second group comparative energy usage data and being presented to enable a comparison to be made between: a) energy usage or cost of energy used by the one or more HVAC units in the conditioning of air supplied to the first group of spaces, and b) energy usage or cost of energy used by the one or more HVAC units in the conditioning of air supplied to the second group of spaces, during at least a portion of the measurement time period, the first group and the second group comparative energy usage data collected with the application of at least one of the Energy Management features being applied differently for spaces in the first group of spaces than for spaces in the second group of spaces.

7. An apparatus for evaluating efficiency of an Energy Management System that includes one or more Energy Management features, the Energy Management System installed in a facility and operatively coupled to a network for controlling over the network one or more HVAC (Heating, Ventilation, and Air Conditioning) units used for conditioning of air supplied to a plurality of conditioned spaces within the facility, the apparatus comprising:

A) a selection mechanism used to perform a selection and assignment of conditioned spaces to at least a first and a second group of spaces;

B) a control mechanism, in response to the selection and assignment of conditioned spaces into at least a first and a second group of spaces, controlling application of at least one of the Energy Management features differently between 1) controlling conditioning of air supplied to spaces in the first group of spaces, and 2) controlling conditioning of air supplied to spaces in the second group of spaces;

C) a measurement mechanism providing first group comparative energy usage or cost data indicative of an amount of energy being used by an HVAC unit for the conditioning of the air supplied to the first group of spaces, and second group comparative energy usage or cost data indicative of an amount of energy being used by an HVAC unit for the conditioning of the air supplied to the second group of spaces;

D) a data collection mechanism operatively coupled to the measurement mechanism and collecting concurrently both first group comparative energy usage data for a plurality of spaces in the first group and second group comparative energy usage data for a plurality of spaces in the second group over a period of time for measurement;

E) a display screen generated by a display mechanism operatively coupled to the data collection mechanism and displaying a comparative energy usage report based upon both the first group and the second group comparative energy usage data, the first group and the second group comparative energy usage data collected with the application of at least one of the Energy Management features being applied differently for spaces in the first group of spaces than for spaces in the second group of spaces; and, F) a computation apparatus for calculating a percentage relationship between the energy usage or cost of energy expended in the conditioning of air for the first and second conditioned spaces, the computation apparatus being operatively coupled to the display mechanism for enabling display of information related to the percentage relationship.

8. An apparatus for evaluating efficiency of an Energy Management System that includes one or more Energy Management features, the Energy Management System installed in a facility and operatively coupled to a network for controlling one or more HVAC (Heating, Ventilation, and Air Conditioning) units used for conditioning of air supplied to a plurality of conditioned spaces within the facility, the apparatus comprising:

A) a selection mechanism enabling selections of conditioned spaces in pairs for assignment into a first group of spaces and a second group of spaces in which one space of the pair is assigned to the first group of spaces, and the other space of the pair is assigned to the second group of spaces;

B) a control mechanism, utilizing at least one of the Energy Management features differently between 1) controlling conditioning of air supplied to spaces in the first group of spaces, and 2) controlling conditioning of air supplied to spaces in the second group of spaces;

C) a measurement mechanism providing first group comparative energy usage indicative of an amount of energy used by at least one HVAC unit for the conditioning of air supplied to at least one space in the first group of spaces, and second group comparative energy usage or cost data indicative of an amount of energy used by at least one HVAC unit for the conditioning of the air supplied to at least one space in the second group of spaces; and D) a data collection mechanism operatively coupled to the measurement mechanism for collecting concurrently overall energy usage data for both the first and second group of spaces over a period of time for measurement; and, E) a display generated by a display mechanism, the display mechanism operatively coupled to the data collection mechanism and generating a comparative energy usage report, the comparative energy usage report being based upon both the first group overall energy usage data and the second group overall energy usage data, the first group and the second group overall energy usage data collected with the application of at least one of the Energy Management features being applied differently for spaces in the first group of spaces than for spaces in the second group of spaces.

9. The apparatus of claim 8 wherein the display mechanism provides physical space layout information relating to the physical layout of the conditioned spaces within the facility, the physical space layout information to aid in the selection of pairs of conditioned spaces for comparison.

10. An apparatus for evaluating efficiency of an Energy Management System that includes one or more Energy Management features, the Energy Management System installed in a facility and operating in control of equipment serving a plurality of spaces within the facility, the system providing for separate controls of one or more Energy Management features in service for each of the plurality of spaces, the apparatus comprising:

A) a selection mechanism comprising a display screen, the selection mechanism providing for a selection and an assignment of the plurality of spaces into at least a first and a second group of spaces, the display screen providing physical characteristics or layout information for the plurality of the spaces as an aid in making the selection and assignment;

B) a control mechanism, controlling at least one of the Energy Management features differently for use in controlling equipment serving spaces in the first group of spaces and in controlling equipment serving spaces in the second groups of spaces;

C) a measurement mechanism providing first group comparative energy usage data indicative of an amount of energy being used by equipment in service to the first group of spaces, and second group comparative energy usage data indicative of an amount of energy being used by equipment in service to the second group of spaces;

D) a data collection mechanism operatively coupled to the measurement mechanism and collecting both the first group and the second group comparative energy usage data concurrently over an established period of time for measurement; and, E) a reporting mechanism operatively coupled to the data collection mechanism for generating a comparative energy usage report, the comparative energy usage report based upon both the first group and the second group comparative energy usage data collected over at least a portion of the established period of time for measurement and the report presented for easily making a comparison between: a) energy usage or cost of energy expended in service to the first group of spaces over at least a portion of the established period of time for measurement, and b) energy usage or cost of energy expended in service to the second group of spaces over that same period of time.

11. The apparatus of claim 10 wherein the selection mechanism provides for user selection of the spaces in pairs for assignment into the first and second group of spaces.

12. A method providing for evaluating efficiencies of an Energy Management System (EMS) that includes one or more Energy Management features, the Energy Management System being operatively coupled to a network for controlling over the network one or more HVAC (Heating, Ventilation, and Air Conditioning) units used for conditioning of air for a plurality of conditioned spaces within a facility, the method comprising the following steps:

A) providing to a user, information descriptive of physical characteristics, room numbers, or layout within the facility of the plurality of the conditioned spaces;

B) enabling selecting of specific conditioned spaces for assignment into at least a first and a second group of conditioned spaces the selecting aided by the information descriptive of physical characteristics, room numbers, or layout within the facility of the plurality of the conditioned spaces;

C) selectively configuring at least one of the Energy Management features such that the first and the second groups of conditioned space are controllable using at least one Energy Management system feature applied differently for the conditioning of air for the spaces in the first and spaces in the second group of conditioned spaces;

D) enabling specification of a measurement period of time during which Energy Management System data is collected;

E) measuring first comparative energy usage data indicative of an amount of energy used by the HVAC units for the conditioning of air supplied to the first group of conditioned spaces, and second comparative energy usage data indicative of an amount of energy used by the HVAC units for the conditioning of air supplied to the second group of conditioned spaces;

F) collecting concurrently the first and second comparative energy usage data over the same measurement period of time; and G) providing comparative energy usage data such that the user can observe energy usage expended in the conditioning of air for the first group of conditioned spaces in comparison to the energy usage expended in the conditioning of air for the second group of conditioned spaces.

* * * * *